United States Patent
Gauthier et al.

(10) Patent No.: US 7,008,527 B2
(45) Date of Patent: Mar. 7, 2006

(54) PROCESS FOR CATALYTIC CRACKING TWO INTEGRATED CRACKING ZONES OF DIFFERENT DEGREES OF SEVERITY FOLLOWED BY A COOLING ZONE

(75) Inventors: Thierry Gauthier, Brignais (FR); Hervé Gauffriez, Oelienas (FR); Joseph Ross, Princeton, NJ (US)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 636 days.

(21) Appl. No.: 10/278,019

(22) Filed: Oct. 23, 2002

(65) Prior Publication Data

US 2004/0079679 A1    Apr. 29, 2004

(51) Int. Cl.
*C10G 11/00* (2006.01)
(52) U.S. Cl. .................. 208/113; 208/123; 208/146
(58) Field of Classification Search ............. 208/113, 208/132, 146
See application file for complete search history.

(56) References Cited

U.S. PATENT DOCUMENTS 3,440,020 A * 4/1969 Owen .................. 422/111
4,417,974 A    11/1983 Haunschild
4,578,183 A    3/1986 Chou et al.
4,820,493 A *  4/1989 Haddad et al. ......... 422/143

FOREIGN PATENT DOCUMENTS

| CN | 1174094 A | * | 2/1998 |
| EP | 0180291 | | 5/1986 |
| EP | 0 312 428 A1 | | 4/1989 |
| EP | 0849347 | | 6/1998 |
| GB | 2216896 A | | 10/1989 |

* cited by examiner

Primary Examiner—Tam M. Nguyen
(74) Attorney, Agent, or Firm—Millen White Zelano & Branigan, P.C.

(57) ABSTRACT

The invention consists in implanting an inner tube fed at its lower portion by a fraction of regenerated catalyst inside a riser (1) of an FCC unit that is fed by catalyst via a line (14) and a feedstock via a line (3), whereby the fluid that allows this feed can be inert, in which case a staging effect of the catalyst inside the riser or else a feedstock (14) that has a tendency toward a more severe cracking inside the inner tube, then leading to an additional production of olefins, in particular propylene, is advantageous. The mixtures of fluids and catalyst are cooled above the tube via a line (13) of an inert fluid.

17 Claims, 1 Drawing Sheet

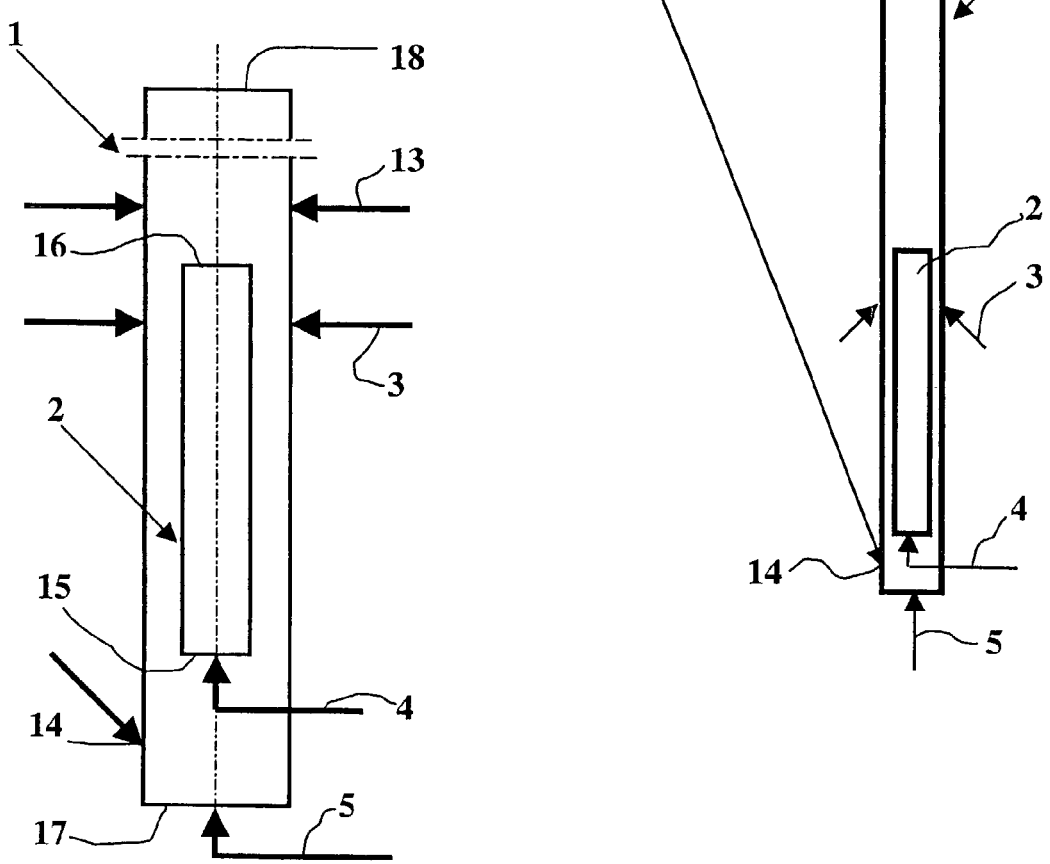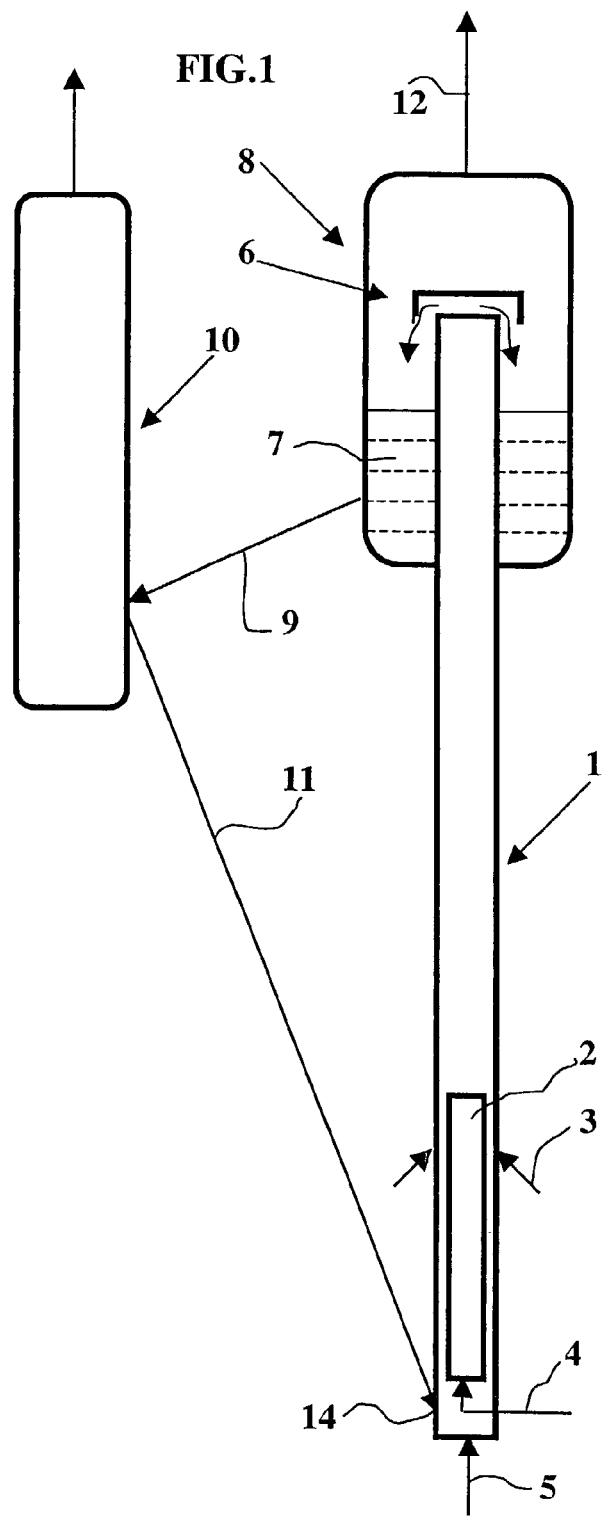

PROCESS FOR CATALYTIC CRACKING TWO INTEGRATED CRACKING ZONES OF DIFFERENT DEGREES OF SEVERITY FOLLOWED BY A COOLING ZONE

The invention is placed in the context of the evolution of catalytic cracking units that are intended to treat increasingly diversified feedstocks to offer an increasingly wide range of products including the "traditional" products such as gasoline and gas oil, to which is added a demand for olefins, more particularly propylene. The evolution of FCC (abbreviation of Fluid Catalytic Cracking that we will use in the following text to designate the fluidized-bed catalytic cracking units) to a petrochemical cracking device dates back to less than ten years and is reflected by a toughening of cracking conditions: higher temperatures, shorter dwell times, higher C/O ratio that corresponds chemically to a secondary cracking of the gasoline that is produced. The solution that is provided by this invention will make it possible to operate a catalytic cracking unit under its usual operating conditions and to superpose on this operation a portion of the unit that works under more severe cracking conditions that will lead to the production of a certain additional amount of olefins, more particularly propylene. The advantage of the invention is, of course, to preserve an FCC unit of standard structure, and by means of relatively simple technological modifications, to offer a range of products that better correspond to the needs of the market. The demand for propylene in particular has actually been rising for a number of years with an annual rate of increase that has often been in excess of one point relative to that of ethylene. Under normal operating conditions on a traditional feedstock of vacuum distillate type, the FCC produces 3 to 4% propylene. It is possible, however, to increase substantially the production of olefins and more particularly of propylene, by the toughening of operating conditions and by the use of specific additives in the cracking catalyst. Such additives, among which ZSM 5-type zeolite can be cited, have a selectivity of shape that makes it possible to orient selectively the cracking of intermediate molecules to the propylene without emphasizing the formation of coke and dry gases.

These severe cracking conditions, both thermal and catalytic, lead to a significant cracking of compounds that are located in the distillation interval of the gasoline and provide increased amounts of propylene.

This known orientation of the catalytic cracking toward the production of propylene overturns the structure of the yields with a drop in the gasoline yield that can pass, for example, from 50% to about 25% to the benefit of the C3/C4 fractions and lighter gases that can accordingly increase from 15 to virtually 40%. The gain of propylene yield is actually obtained to the detriment of the gasoline yield. This reduction in gasoline yield is not desirable, however, while the gasoline market demand remains steady. There is therefore a real need for an FCC evolution that would allow it to fully preserve its role as gasoline producer (and gas oil producer) while increasing its capacity for producing olefins and in particular propylene.

The invention offers a simple technological solution to this problem and does not require the design of a specific unit. The invention pertains very well to the remodeling of existing units. It essentially consists of a staged feeding of the riser with regenerated catalyst, whereby this catalyst preserves a standard circulation scheme, as in a traditional FCC unit. A first zone for introducing catalyst that is located at the base of the riser, as in the scheme of a conventional FCC unit, makes it possible to ensure the gasoline and gas oil base production as well as that of other fractions that are obtained from a conventional FCC unit, and a second introduction of regenerated catalyst that is located higher than the first, and contacting a specific feedstock will make it possible by means of certain operating conditions to provide additional activity that, based on said additional specific feedstock, will be reflected by the desired increment in olefin production. If, in addition, the unit is operated with the use of additives to the conventional catalyst, such as ZSM5, the production of olefins, and particularly propylene, will be increased relative to what it would be in a conventional FCC unit that is operated with the same additive.

There are several patents that mention the injection of hydrocarbon fractions that are obtained from the FCC unit, for example recycled naphtha, upstream from the feedstock injection to obtain a conversion to propylene under severe conditions of C/O and temperature. This is, for example, the case of Exxon Patent EP 0849 347 A2 and IFP Patent FR 88 04800. In the type of configuration that is described in these patents, the fact of initiating a first cracking on a light feedstock before the cracking of the main feedstock considerably reduces the temperature potential of the regenerated catalyst and thereby makes the vaporization of the main feedstock very difficult.

Mobil Patent U.S. Pat. No. 3,440,020 describes a system of two tubular risers that are placed coaxially inside one another and that empty into the reactor independently of one another. One of the risers is fed by a light feedstock and the other by the heavier base feedstock. In this patent, the two risers are constituted in a totally independent manner, and the catalyst that is used for the cracking of the light feedstock is therefore not used to increase the conversion of the main feedstock.

Mobil Patent U.S. Pat. No. 4,578,183 and EP 0180291 describe a central tube that is positioned coaxially inside the riser and located at the lower portion of said riser. The feedstock is introduced axially at the base of the central tube and is contacted inside this tube by a portion of the catalyst. The other portion of the catalyst completely short-circuits the zone of injection and vaporization of the feedstock by circulating outside of the tube system, and it returns to the flow of catalyst that circulates inside the tube by orifices that are located on the wall of this central tube. In this configuration, there is no monitoring of the temperature downstream from the evaporation zone. In addition, contrary to this invention, the main feedstock is introduced axially rather than on the wall, through a set of injectors such as those that are described in Patent FR 87 14194 of the applicant.

Chevron Patent U.S. Pat. No. 4,417,974 proposes a configuration that is characterized by a tube that is located insider the riser and in an essentially coaxial manner, whereby this tube is fed by a portion of regenerated catalyst and a hydrocarbon feedstock under mild cracking conditions since the temperature inside the central tube is between 400 and 500° C. Under these conditions, it is possible to think that there is very little cracking inside this central tube. The other portion of the catalyst circulates outside the central tube and contacts the main feedstock that is introduced at the wall of the riser. The catalyst flows of the same density that are obtained from the central tube and the annular portion of the riser return to a relatively high level in the riser, and no system for cooling these flows is claimed because the flow temperature in the central tube is reduced.

This invention is clearly distinguished from the cited patent by the cracking conditions inside the central tube that are severe cracking conditions, and by the fact that downstream from the central tube, an injection of a feedstock that can be easily evaporated and that is intended to monitor the temperature at the riser outlet is provided.

One of the objects of the invention is to eliminate the drawbacks of the prior art. Another object is to promote the GPL selectivity, particularly in light olefins, and in particular in propylene, and/or to improve the conversion capacity. Another object is to allow a severe cracking in the tubular zone of the riser while having mild cracking conditions in the upper portion of the riser.

More specifically, the invention relates to a fluidized-bed catalytic cracking process of a hydrocarbon feedstock in a rising reaction zone (1) or riser comprising the introduction (14) of a regenerated catalyst at the lower portion of the riser, the injection of the feedstock above the introduction of the catalyst, injection (5) of a fluidization gas of the catalyst at the base of the riser, whereby the reaction zone comprises in its lower portion an inner tubular zone that is essentially coaxial in which a portion of the regenerated catalyst is circulated with a transport fluid that is introduced at the lower end of the tubular zone; and the remaining portion of the catalyst and the feedstock are circulated in an annular zone that is defined between the tubular zone and the reaction zone, whereby the process is characterized in that said portion of catalyst and the transport fluid are circulated in the tubular zone under more severe conditions of temperature and/or catalyst to transport fluid mass ratio than the conditions of temperature and/or catalyst to feedstock mass ratio that prevail in the annular zone. A first flow that exits from the tubular zone and a second flow that exits from the annular zone are mixed, and the mixture that is obtained and that contains the catalyst is cooled by the injection of an inert fluid that can be vaporized at or above the injection of the feedstock; and the cooled mixture is cracked in the upper portion of the reaction zone.

According to another characteristic of the process, the catalyst to feedstock mass ratio can be between 2 and 10 in the annular zone and between 5 and 20 in the tubular zone, whereby said ratio in the tubular zone is greater than the one in the annular zone.

According to another characteristic of the process, the catalyst to feedstock mass ratio in the annular zone can be between 4 and 7, and the one in the tubular zone is between 8 and 15.

According to another characteristic of the process, it is possible to cool said mixture such that the temperature in the upper portion of the reaction zone is between 500 and 550° C.

According to another characteristic of the process, the density of the catalyst in the annular zone can be between 200 and 600 kg/m$^3$ whereas the density in the tubular zone, lower than that in the tubular zone, is between 30 and 200 kg/m$^3$.

It is possible to monitor the temperature at the outlet of the reaction zone by monitoring the flow rate of regenerated catalyst and the flow rate of inert fluid that can be vaporized.

It is also possible to monitor the outlet temperature of the tubular zone by monitoring the flow rate of the transport fluid.

It is also possible to monitor the outlet temperature of the annular zone by monitoring the flow rate of regenerated catalyst and the flow rate of inert and vaporizable fluid.

The tubular zone comprises an upper end for output of the first flow, generally at the same level or above the level of injection of the feedstock and at the same level or below the level of injection of inert fluid.

The invention consists in carrying out with a minimum of technological modifications a double cracking in parallel within the riser of an FCC unit by the use inside of said riser of an inner tube that will act as a second riser, operating in parallel with the first. For the clarity of the specification, in the text below, first cracking will be called the cracking that is carried out on a traditional vacuum distillate-type feedstock or residue inside the riser that will be called main feedstock, and the second cracking will be called the cracking that is carried out inside the inner tube on a specific feedstock. The technology that is used for implementing this second specific cracking consists in implanting inside the riser the tubular zone that comprises an inner tube that is positioned essentially coaxially to the riser, whose lower end is located at any level below the level of injection of the main feedstock, and whose upper end advantageously empties at a level that is located above the injection zone of said main feedstock, and below the level of injection of an inert and easily vaporizable feedstock that is intended to monitor the temperature of the riser such that the catalyst that is introduced at the base of this inner tube does not encounter the main feedstock directly and therefore does not contribute to its vaporization.

To avoid any confusion, riser will continue to be called the riser of the FCC unit that, because of the presence of an inner tube over a portion of its length, will exhibit an annular portion followed, in the direction of flow of fluids and catalyst, by a cylindrical portion. All of the regenerated catalyst continues to be introduced at the base of the riser in a dense fluidization state, as is currently the case in the FCC units. A preferably minor portion of this catalyst, however, is directed by means of a suitable transport fluid, that may or may not be reactive, inside the inner tube. The other portion of the catalyst circulates around this inner tube in the annular zone of the riser and contacts the main feedstock by ensuring its vaporization and then its subsequent cracking.

The portion of the catalyst that is introduced inside the inner tube in co-current with the flow of the catalyst around the tube, by means of a transport gas, exhibits a flow density state that is clearly lower than the portion of catalyst that circulates in the annular zone. The difference in density produces, by a gas-siphon effect, a rising circulation movement inside the inner tube and a circulation movement around the inner tube in the annular zone that will make possible the feed of the inner tube. The flow rate of catalyst that circulates in the inner tube will be adjusted with transport gas. It can also be adjusted, if necessary, by a "plug-valve"-type valve, i.e., a valve that operates as a type of piston, as is found at the base of the lift that makes it possible to pass the catalyst from the first to the second regeneration stage of R2R-type units of the applicant. Advantageously, this transport gas can be a hydrocarbon that will be cracked under severe conditions, such as light gasoline in order to produce propylene. This variant also exhibits the additional advantage of cooling the catalyst that circulates in the inner tube, which is essential for monitoring the downstream temperature in the riser, and has this advantage without coking the catalyst significantly since the coke delta induced by light gasoline cracking is very small. The cooling of catalyst that circulates inside the tube by the effect of the vaporization and the reaction of a hydrocarbon feedstock such as light gasoline being inadequate, in general the cooling of this catalyst is provided downstream from the inner tube by any known means, such as, for example, an injection of an inert and easily vaporizable feedstock such as the one that is now practiced in the FCC units. The injection of an inert material that will vaporize downstream from the outlet of the tube also has the advantage of creating a strong turbulence that will promote the mixing between the catalyst and the fluids that exit the tube, and the catalyst and the fluids that have circulated outside of the tube.

To absorb the molar expansion variations, the lower portion of the reaction zone in which the feedstock is injected and which comprises the annular zone and the tubular zone can be at least in part tapered, the base of the frustrum of the cone generally being near the upper end of the tubular zone.

To withstand the erosion that may be significant due to the movement of the catalyst in this zone but also due to means that are used to spray the feedstock that can induce locally high flow speeds, the inner tube should be selected from a material that is resistant to abrasion outside of the tube, particularly in the zone near the injection of feedstock. Protecting the other portions of this tube to improve its mechanical behavior will also be ensured. It will be possible, for example, to use a carbon steel tube, on which refractory cement layers will be deposited, fixed to the walls of the tube with anchoring points soldered to the walls, or with honeycomb structures of hexmesh type, for example, that are well known to one skilled in the art.

It is also possible to consider carrying out surface treatments on a steel tube to obtain a resistant coating such as stellite. Plasma thermal protection onto a metal tube that makes it possible to obtain very abrasion-resistant ceramic-type coatings will also be cited.

Modifications to be made to a traditional FCC unit are therefore limited to the use of an inner tube, to the use of an injection of catalyst transport fluid in the inner tube, optionally a complete injection system when this transport fluid will be a specific feedstock to be cracked, and the use of an injection of an easily vaporizable fluid, downstream from the outlet of the inner tube, if the latter does not already exist on the FCC unit being considered.

SUMMARY DESCRIPTION OF THE FIGURES

The invention will be better understood based on the following illustrative figures, among which:

FIG. 1 exhibits the general structure of an FCC unit according to the invention, and FIG. 2 is a representation of an inner tube with the detail of the introduction of the transport fluid of the catalyst and the specific cooling feedstock.

As an example, FIG. 1 exhibits the diagram of a standard FCC unit in which is found, in the direction of circulation of the catalyst, a riser (1) that is fed at its base by catalyst that is regenerated via a line (11) and terminated at its upper end by a solid gas separation system (6) that can be of any type that is known to one skilled in the art, from a simple ballistic separator that rests upon the impact of the gas/solid mixture on a target to more elaborate systems such as cyclones that are directly connected to the upper end of the riser or specific systems that promote the quick inertial release of vapors that are produced and the catalyst that also rest on a rotation of the gas/solid suspension and whose description will be found, for example, in Patents EP-A-0852963 and EP-A1017762. This riser is defined within the scope of this invention as a chamber with axial symmetry that is elongated along an essentially vertical axis and that may or may not exhibit section variations. Riser (1) exhibits a closed lower end (17) and an open upper end (18) and can communicate with gas/solid separation system (6) that is contained in a separation and stripping chamber (8).

The catalyst is then directed to a stripping zone (7) that makes it possible to recover a portion of the hydrocarbons that are adsorbed on the surface of the catalyst before being directed to a regeneration zone (10) via a pipe (9). This regeneration zone (10) will not be described in this text to the extent that it is not a decisive part for the invention. Any regeneration zone of one or more stages, such as the one that exists in R2R-type units, is completely compatible with this invention that requires no modification of said regeneration zone on an existing FCC unit.

The effluents of the cracking reaction are evacuated from chamber (8) by a line (12) to be directed to a fractionation zone that is not shown in FIG. 1.

The regenerated catalyst that is introduced at the base of riser (1) by means of line (11) is separated into two fractions, a fraction of dense flow at apparent density levels of between 600 and 200 kg/m$^3$, preferably between 250 and 400 kg/m$^3$, that circulates in the annular portion of riser (1) up to the feedstock injection zone, and a fraction in the dilute state at lower density levels and between 200 and 30 kg/m$^3$, and preferably between 100 and 50 kg/m$^3$, which circulates inside an inner tube (2) that is located in the lower portion of the riser. The flow rates that circulate inside and outside the tube from a single feed of regenerated catalyst are imposed by the difference in flow density between the two catalyst fractions. The dilute fraction that circulates inside the inner tube is created by the injection with a line (4) of a transport fluid of the catalyst that can be liquid or gaseous. Among the gaseous fluids, it is possible to cite nitrogen, water vapor, diesel fuel, liquefied petroleum gas (GPL) or any mixture of these different products. Among the liquid fluids, it is possible to cite the light gasoline whose final boiling point is approximately 160° C., the heavy gasoline whose initial boiling point is approximately 160° C., and the final boiling point is approximately 220° C., the light cycle oil (LCO) whose initial boiling point is approximately 220° C., and the final boiling point is approximately 350° C., or more generally, any petroleum fraction whose final boiling point is less than 360° C. and mixtures thereof.

It is also possible to consider synthetic petroleum fractions such as the liquid products of oligomerization processes of C4, C5 or C6 fractions that contain a high proportion of C8–C10 long olefins that will preferably crack by forming propylene. Of course, when the transport fluid is liquid, taking into account the temperature of the catalyst at the inlet of the inner tube that is virtually that of the catalyst at the outlet of the regeneration zone, or approximately 800° C., a vaporization of the transport fluid will occur, which will contribute to the cooling of the catalyst and to the monitoring of the temperature at the outlet of the riser.

Transport fluid (4) is introduced at the base of inner tube (2) at a flow rate such that the mean density of the flow in the inner tube is strictly less than the density of the flow in the lower portion of the riser. The mean void rate of the flow inside the inner tube can be greater then 0.8 and preferably greater than 0.9.

The surface flux of the flow inside the inner tube is between 0.1 and 10× the surface flux of the flow in riser (1) and preferably between 0.5 and 3× the surface flux of the flow in the riser.

In the case where the transport fluid is a hydrocarbon feedstock that contains molecules with at least 4 carbon atoms that can crack catalytically, the temperature at the outlet of the inner tube will be between 520° C. and 650° C., preferably between 560 and 600° C. The adjustment of this temperature to the desired value can be done by the flow of catalyst that circulates inside the inner tube.

The catalyst flow rate will itself be monitored either directly by the transport fluid flow rate in the case where the inner tube does not comprise any control for specifically regulating the catalyst flow rate or by an organ for specific regulation of the catalyst flow rate among which it is possible to cite the "plug valve"-type valves or parallel-slide gate valves, or any other type of organ that makes it possible to vary the catalyst inlet section at the base of the inner tube.

A means for introducing a fluidization gas (5) is located at the base of riser (1) and makes it possible to monitor the density of the catalyst in this zone. This introduction means already exists in the FCC units and does not need to be modified for the requirements of this invention. The fluidization gas can be selected from among the following gases: nitrogen, water vapor, diesel fuel or GPL, or any other chemically inert gas.

The regenerated catalyst is introduced at the base of riser (1) via an introduction means (14) that does not need to modified relative to the one that already exists in any FCC unit. For good circulation of the catalyst, this introduction of catalyst (14) is generally located upstream from the injection of main feedstock (3), but it can, having no impact on the circulation of catalyst, be located upstream or downstream from the lower end of inner tube (2).

This will be particularly advantageous in the case of remodeling an FCC unit on which will exist possibilities of extension toward the bottom of the riser. Actually, in this case, it will be possible to add the riser element that contains inner tube (2) to the lower portion of the existing riser, without modifying the means for introducing catalyst (14). The lower end of inner tube (2) will then be located at a lower level than that of the introduction of catalyst (14) without the least disadvantage being exhibited.

The introduction of the main feedstock inside the riser will be done by a suitable injection system (3) as was described in, for example, Patent EP-A-312428. The main feedstock will be a vacuum distillate (DSV), an atmospheric residue (RA), a vacuum residue (RSV) or any mixture of these various pairs. The only difference relative to the injection configuration of a traditional FCC unit is that the upper end of the inner tube that preferably empties downstream from the injection system of feedstock (3), this feedstock injection will take place in the annular zone of the riser around the central tube, which will optionally result in slightly reducing the outlet injection speeds of the sprayers. The gaseous phase at the outlet of the injectors will typically have a speed of between 20 and 100 m/s, preferably 50 to 80 m/s.

The catalyst to feedstock mass ratio, designated C/O, will be usually between 2 and 10 and preferably between 4 and 7 in the annular zone. In all cases, this ratio will be sufficient to allow the total vaporization of the feedstock and to maintain a temperature of the catalyst/feedstock mixture after vaporization that is greater than 500° C., for example 510 to 550° C.

Inner tube (2), entirely contained inside riser (1), is defined in a general manner as a chamber with axial symmetry that is elongated along an essentially vertical axis and placed in an essentially coaxial manner relative to riser (1) and that comprises an open lower end (15) and an open upper end (16).

Lower end (15) is located at a level that is strictly lower than the level for introducing main feedstock (3), and upper end (16) is located at a higher or equal level, preferably higher than the level for introducing feedstock (3) and lower or equal to, preferably lower than the level of injecting an inert and easily vaporizable fluid (13) that is intended to monitor the temperature of the riser. The middle section that is occupied by inner tube (2) relative to the section of the riser at same elevation (1) is generally located in the range of 0.1 to 0.5 and advantageously 0.12 to 0.45, and preferably in the range of 0.15 to 0.30 at the level of the feedstock injectors. The section of inner tube (2) is not necessarily constant, but may exhibit variations, in particular at its lower portion that can be equipped with a restriction intended to cause a pressure drop that makes it possible to better monitor the flow rate of catalyst that enters the inside of the inner tube.

The length of inner tube (2) will be defined based on the desired dwell time in the case where a cracking of a specific feedstock takes place inside said inner tube. In the case of the cracking of a light gasoline, the dwell time will be between 100 ms and 10 s, preferably between 0.5 and 5 s.

The riser outlet temperature regulation is carried out in a standard manner from the flow rate of regenerated catalyst that enters the riser via a valve, for example a parallel-slide gate-type valve that is placed on line (11) for directing the regenerated catalyst to the riser.

The temperature at the outlet of the riser is set based on desired cracking conditions in a range of between 500 and 550° C.

There is a necessity to provide, if it does not already exist on the unit, a system (13) for injecting a light fluid that vaporizes easily, advantageously positioned downstream from the upper end of the inner tube so as to be able to monitor the temperature at the outlet of the riser in all conceivable cases, i.e., in particular in the case where the transport fluid in the inner tube cannot be vaporized and does not undergo any reaction inside said tube. The fluid that is used for this injection (13) can be any petroleum fraction that has a final boiling point that is less than 360° C., such as, for example, a portion of the LCO that is produced by the unit.

The conditions of good circulation of the catalyst inside the inner tube and outside said tube in the annular zone of the riser will advantageously be carried out if the inner tube has its lower end located strictly below the level of injection of the main feedstock, and its upper end located above the level of injection of the main feedstock while remaining below the level of injection of the fluid that is inert and easily vaporizable (13). In some cases, it may be advantageous to locate the lower end of the inner tube below the level for introducing regenerated catalyst into the riser. These conditions are not restricting and make the implementation of this invention very easy.

In the case where it is desired to facilitate the introduction of the catalyst inside the inner tube, it will be possible to provide the latter with at least one restriction at its lower end that makes it possible to create a pressure drop that will make it easier to monitor the flow rate of catalyst that enters inside said tube. In this case, nevertheless, the catalyst flow rate will be directly linked to that of the transport fluid, i.e., it will not be possible to vary at will the C/O ratio inside the inner tube. If it is desired to decouple the flow rate of catalyst that enters the inner tube from the flow rate of the transport fluid, it will be necessary to equip the inner tube at its lower end with a valve that makes it possible to vary the passage section of the catalyst inside said tube.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

The advantage of the invention will be illustrated by three comparative examples according to the invention, relative to a base case that corresponds to a conventional FCC unit.

The FCC unit treats a heavy feedstock of the hydrotreated atmospheric residue type. This unit is equipped with a regeneration zone that is provided with two regenerators and that operates under the main conditions that are described in Table 1 in the base-case column. It is also equipped with a zone for injecting inert fluid (cooling recycling) that is located above the feedstock injection zone for cooling the reactor downstream from the evaporation zone.

By calculation, we simulated the impact that a tube would have that is placed at the bottom of the riser according to the invention, inside of which the cracking of an amount of gasoline takes place. The tube that is being considered in this example occupies 15% of the section of the riser at the level of the feedstock injectors, the input being located at 5 m under the level of the feedstock injectors and the output being located 3 m above said injectors; whereby the catalyst is introduced below the tubular zone.

For clarity, the comparative examples (cases 1, 2 and 3) were treated under the following conditions:

The vaporization conditions of the feedstock are maintained: the temperature of the feedstock and the catalyst at equilibrium around the inner tube at the level of the cooling recycling injection is identical to the temperature upstream from the injection of the cooling liquid under the conditions of the base case, or 544° C.

The reaction conditions are maintained in the upper portion of the riser. The temperature at the outlet of the riser is kept constant and equal to 508° C.

The feedstock flow rate and main parameters that govern the thermal balance of the unit are maintained.

A constant proportion of gasoline introduced in the tube relative to the feedstock or 15% per unit of mass is maintained.

The same cooling liquid that is a not very reactive liquid, a light LCO in the example, is used.

In the three cases (1, 2, and 3), we chose to impose a gasoline flow rate in the tube that is equal to 1% of the flow rate of the conventional feedstock. The cracking temperature at the outlet of the tube was imposed as equal to 580° (case 1), 600° (case 2) or 586° C. (case 3).

The parameters of the thermal balance that make it possible to maintain the temperatures in different portions of the riser are:

The total flow rate of catalyst.

The fraction of the flow rate of catalyst circulating in the tube.

The flow rate of cooling recycling liquid.

Table 1 summarizes the main operating conditions and the yields calculated at the riser outlet relative to the injected feedstock.

In case 1, the gasoline that is injected at the inlet of the tube is a cracking product of the feedstock. It is light gasoline (C5—180°). The propylene yield rises to 5% versus 3.74% in the base case.

The conversion is 72.8% versus 69% in the base case.

In case 2, the injected gasoline is the same as in case 1, but the cracking conditions are more severe (outlet temperature of the tube of 600° C. versus 580° C. in case 1). The propylene yield rises to 5.4%, and the conversion is 74%.

In case 3, the fraction that is injected in the tube is a totally aromatic feedstock that is obtained from the gasoline fraction that consists of C7-C8-C9. This feedstock virtually does not react, and this third case therefore makes it possible to illustrate the staging effect of the catalyst, whereby the upper portion of the riser works with a more active catalyst than in the base case.

The conversion is increased and rises to 76% versus 69% in the base case.

TABLE 1

| Operating Conditions of the Riser | | Test Run | Case 1 | Case 2 | Case 3 |
|---|---|---|---|---|---|
| Mixing temperature around the tube | ° C. | 544 | 544 | 544 | 544 |
| Temperature at the outlet of the tube | ° C. | 580 | 580 | 600 | 586 |
| Reactor outlet temperature | ° C. | 508 | 508 | 508 | 508 |
| Flow rate of fresh feedstock | T/j | 3869 | 3869 | 3869 | 3869 |
| Flow rate of fluid in the tube | % feedstock | 0.00 | 15.00 | 15.00 | 15.00 |
| Cooling recycling flow rate | % feedstock | 25.98 | 40.77 | 48.57 | 41.32 |
| Total vapor in the riser | % | 12.12 | 12.12 | 12.12 | 12.12 |
| Flow rate of catalyst around the tube | T/j | | 21745 | 22635 | 22054 |
| Flow rate of catalyst in the tube | T/j | | 5456 | 6732 | 5030 |
| Flow rate of catalyst in the riser | T/j | 20932 | 27201 | 29367 | 27084 |
| C/O in the tube (fluid in the tube) | (–) | | 9.40 | 11.60 | 8.67 |
| C/O around the tube (% fresh feedstock) | (–) | 5.41 | 5.62 | 5.85 | 5.70 |
| C/O upper portion of the riser (% fresh feedstock) | (–) | 5.41 | 7.03 | 7.59 | 7.00 |
| T regenerator 1 | ° C. | 692.24 | 686.00 | 679.36 | 685.07 |
| T regenerator 2 | ° C. | 771.31 | 762.00 | 753.17 | 760.61 |
| Riser outlet yields | | Test run | Case 1 | Case 2 | Case 3 |
| DRY GASES | % | 4.57 | 5.01 | 5.19 | 4.23 |
| C3= | % | 3.74 | 4.99 | 5.40 | 4.04 |
| LPG | % | 15.47 | 19.18 | 20.20 | 16.73 |
| GASOLINE | % | 41.93 | 38.77 | 38.39 | 45.33 |
| LCO | % | 17.97 | 17.18 | 16.75 | 15.95 |

TABLE 1-continued

| Operating Conditions of the Riser | | Test Run | Case 1 | Case 2 | Case 3 |
|---|---|---|---|---|---|
| SLURRY | % | 12.18 | 10.03 | 9.31 | 8.12 |
| COKE | % | 7.88 | 9.82 | 10.18 | 9.65 |

It should be noted that the conversion of the gasoline strongly depends on its chemical nature and that it could be possible with other fractions, such as C8-olefinic fractions, for example, to obtain higher yields such as 25 to 35% of propylene easily under the same conditions. With the cracking gasoline that is being considered in this example, it is nevertheless possible to modify the overall structure of yields in a very significant manner since the overall yield of propylene that is expressed based on the fresh feedstock will go from 3.7 to 5–5.4%.

By the same token, an increase in the conversion in the riser is noted that results from the increase in the flow rate of catalyst in the upper portion, whereby the catalyst that is obtained from the tube is not very coked and therefore provides a significant residual activity once remixed with all of the effluents downstream from the inner tube.

The preceding examples can be repeated with similar success by substituting the generically or specifically described reactants and/or operating conditions of this invention for those used in the preceding examples.

The entire disclosure of all applications, patents and publications cited above is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for fluidized-bed catalytic cracking of a hydrocarbon feedstock in a rising reaction zone (1) or riser comprising the introduction (14) of a regenerated catalyst at the lower portion of the riser, the injection of the feedstock above the introduction of the catalyst, injection (5) of a fluidization gas of the catalyst at the base of the riser, whereby the reaction zone comprises in its lower portion an inner tubular zone (2) that is essentially coaxial in which a portion of the regenerated catalyst is circulated with a transport fluid that is introduced at the lower end of the tublar zone; and the remaining portion of the catalyst and the feedstock are circulated in an annular zone that is defined between the tubular zone and the fraction zone, whereby the process is characterized in that said portion of catalyst and the transport fluid are circulated in the tubular zone under more severe conditions of temperature and/or catalyst to transport fluid mass ratio than the conditions of temperature and/or catalyst to feedstock mass ratio that prevail in the annular zone, whereby a first flow that exits from the tubular zone and a second flow that exits from the annular zone are mixed, and the mixture that is obtained that contains the catalyst is cooled by injection (13) of an inert and vaporizable fluid at or above the injection of the feedstock; and the cooled mixture is cracked in the upper portion of the reaction zone wherein the upper of the tubular zone is located above the zone for injecting the feedstock and below the zone for injecting the inert fluid.

2. Process according to claim 1, wherein the catalyst to feedstock mass ratio is between 2 and 10 in the annular zone and between 5 and 20 in the tubular zone, whereby said ratio in the tubular zone is greater than the one in the annular zone.

3. Process according to claim 1, wherein the catalyst to feedstock mass ratio in the annular zone is between 4 and 7 and the one in the tubular zone is between 8 and 15.

4. Process according to claim 1, wherein said mixture is cooled so that the temperature in the upper portion of the reaction zone is between 500 and 550° C.

5. Process according to claim 1, wherein the density of the catalyst in the annular zone is between 200 and 600 kg/m$^3$, whereas the density in the tubular zone, lower than that in the annular zone, is between 30 and 200 kg/m$^3$.

6. Process according to claim 1, wherein the temperature at the outlet of the reaction zone is monitored by monitoring the flow rate of regenerated catalyst and the flow rate of inert and vaporizable fluid.

7. Process according to claim 1, wherein the temperature at the outlet of the tubular zone is monitored by monitoring the flow rate of the transport fluid.

8. Process according to claim 1, wherein the temperature at the outlet of the annular zone is monitored by monitoring the flow rate of regenerated catalyst and the flow rate of inert and vaporizable fluid.

9. Process according to claim 1, wherein the tubular zone comprises an upper outlet end of the first flow at the same level or above the level of injection of the feedstock and at the same level or below the level of injection of the inert fluid.

10. Process according to claim 1, wherein the transport fluid is a secondary hydrocarbon feedstock that is selected from the group that is formed by a light gasoline with a final boiling point that is close to 160° C., a heavy gasoline, an LCO fraction, a petroleum fraction with a final boiling point of less than 360° C., a gasoline that has a majority of long $C_{8-10}$ olefins resulting from the oligomerization of C4, C5 or C6 fractions and mixtures thereof.

11. Process according to claim 1, wherein the transport fluid that makes it possible to feed the inner tube with regenerated catalyst is selected from the group that is formed by nitrogen, water vapor, diesel fuel, liquid petroleum gas and mixtures thereof.

12. Process according to claim 1, wherein the surface flow of catalyst that circulates inside the inner tubular zone is between 0.1 and 10×, and preferably between 0.5 and 3× the surface flow of catalyst that circulates in the riser.

13. Process according to claim 1, wherein the tubular zone has its lower end located below the level of injection of the feedstock.

14. Process according to claim 1, wherein the tubular zone has at least one restriction at its lower end that makes it possible to create a pressure drop that facilitates the monitoring of the flow rate of the catalyst that enters inside said tubular zone.

15. Process according to claim 1, wherein the tubular zone is provided at its lower end with a valve that makes it possible to vary the passage section of the catalyst inside the tubular zone.

16. Process according to claim 1, wherein the tubular zone has a section that, relative to the section of the riser, is located in a ratio of between 0.1 and 0.5 and preferably between 0.15 and 0.30

17. Process according to claim 1, wherein the lower portion of the reaction zone in which the feedstock is injected and which comprises the annular zone and the tubular zone is at least partly tapered, whereby the base of the frustum of cone is close to the upper end of the tubular zone.

* * * * *

UNITED STATES PATENT AND TRADEMARK OFFICE
CERTIFICATE OF CORRECTION

PATENT NO.        : 7,008,527 B2
APPLICATION NO.   : 10/278019
DATED             : March 7, 2006
INVENTOR(S)       : Thierry Gauthier et al.

It is certified that error appears in the above-identified patent and that said Letters Patent is hereby corrected as shown below:

Column 11, line 51, reads "tublar zone;" should read -- tubular zone; --

Signed and Sealed this

Twenty-fifth Day of July, 2006

JON W. DUDAS
*Director of the United States Patent and Trademark Office*